United States Patent
Kadam et al.

(10) Patent No.: US 10,987,614 B2
(45) Date of Patent: Apr. 27, 2021

(54) RETROFITTABLE NO FILTER NO RUN FILTRATION SYSTEM

(71) Applicant: Cummins Filtration IP, Inc., Columbus, IN (US)

(72) Inventors: Pravin Shantinath Kadam, Maharashtra (IN); Sudhindra Palaxa Arakeri, Shahapur (IN); Kevin C. South, Cookeville, TN (US); Ismail C. Bagci, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 243 days.

(21) Appl. No.: 16/081,332

(22) PCT Filed: Mar. 7, 2017

(86) PCT No.: PCT/US2017/021126
§ 371 (c)(1),
(2) Date: Aug. 30, 2018

(87) PCT Pub. No.: WO2017/155974
PCT Pub. Date: Sep. 14, 2017

(65) Prior Publication Data
US 2019/0076758 A1 Mar. 14, 2019

Related U.S. Application Data

(60) Provisional application No. 62/305,273, filed on Mar. 8, 2016.

(30) Foreign Application Priority Data

May 3, 2016 (CN) .......................... 201620390745.8

(51) Int. Cl.
*B01D 29/96* (2006.01)
*B01D 29/21* (2006.01)
(Continued)

(52) U.S. Cl.
CPC ............ *B01D 29/96* (2013.01); *B01D 29/21* (2013.01); *B01D 35/153* (2013.01);
(Continued)

(58) Field of Classification Search
CPC .... B01D 35/157; B01D 27/10; B01D 35/147; B01D 35/153; B01D 35/30; B01D 35/1573; B01D 27/103; B01D 27/106; F02M 37/22
See application file for complete search history.

(56) References Cited

U.S. PATENT DOCUMENTS 3,900,400 A * 8/1975 Whitfield ............... B01D 35/06
210/238
4,384,962 A 5/1983 Harris
(Continued)

OTHER PUBLICATIONS

International Search Report and Written Opinion issued for PCT/US2017/021126, dated May 23, 2017, 16 pages.

*Primary Examiner* — Ana M Fortuna
(74) *Attorney, Agent, or Firm* — Foley & Lardner LLP

(57) ABSTRACT

A no filter no filter no run attachment is disclosed. A shell defines a fluid passage from an upstream fluid aperture at a first end for fluid receiving communication with a filtration cartridge to a downstream fluid aperture at a corresponding second end sized and shaped for coupling to a fluid pump inlet. The shell further defines a pin aperture at the first end sized to receive a pin from the filtration cartridge. A divider segments the fluid passage into an upstream portion that comprises the upstream fluid aperture and the pin aperture and a downstream portion that comprises the downstream fluid aperture. The divider also defines an internal aperture that allows fluid communication between the upstream portion and the downstream portion. A ball is disposed in the upstream portion in fluid flow receiving communication (Continued)

with the upstream fluid aperture, and is sized to have a greater diameter than the internal aperture.

23 Claims, 3 Drawing Sheets

(51) Int. Cl.
    *B01D 35/153*     (2006.01)
    *F02M 37/22*     (2019.01)

(52) U.S. Cl.
    CPC ..... *F02M 37/22* (2013.01); *B01D 2201/0415* (2013.01); *B01D 2201/4046* (2013.01)

(56) References Cited

U.S. PATENT DOCUMENTS

| | | | |
|---|---|---|---|
| 6,248,236 B1 | 6/2001 | Hodgkins | |
| 7,431,575 B2 * | 10/2008 | Hawkins | F02M 37/08 417/440 |
| 8,920,648 B2 * | 12/2014 | Thomas | B01D 29/21 210/235 |
| 8,968,565 B2 * | 3/2015 | Thomas | B01D 29/21 210/235 |
| 9,592,460 B2 * | 3/2017 | Arakeri | B01D 29/15 |
| 10,688,423 B2 * | 6/2020 | Straussberger | B01D 29/114 |
| 2003/0057146 A1 | 3/2003 | Rickle et al. | |
| 2008/0179263 A1 | 7/2008 | Wieczorek et al. | |
| 2009/0020465 A1 | 1/2009 | Jiang et al. | |
| 2011/0017155 A1 | 1/2011 | Jacob | |
| 2012/0024771 A1 | 2/2012 | Abdalla et al. | |
| 2015/0273369 A1 | 10/2015 | Le Ven et al. | |
| 2020/0147529 A1 * | 5/2020 | Kadam | B01D 29/96 |

* cited by examiner

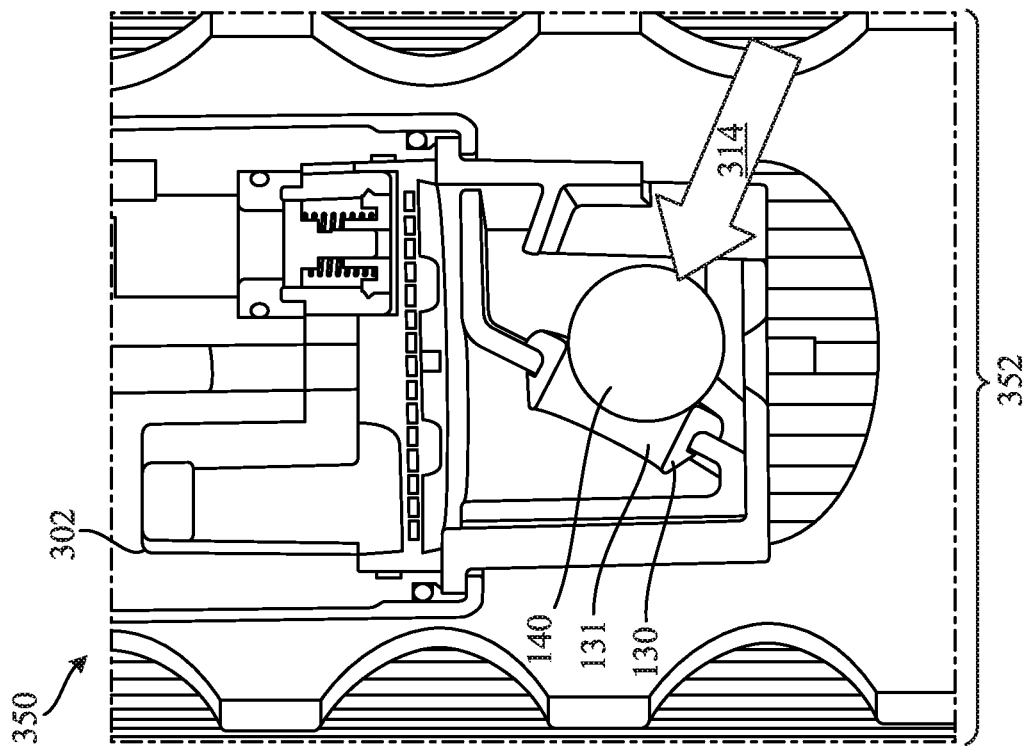
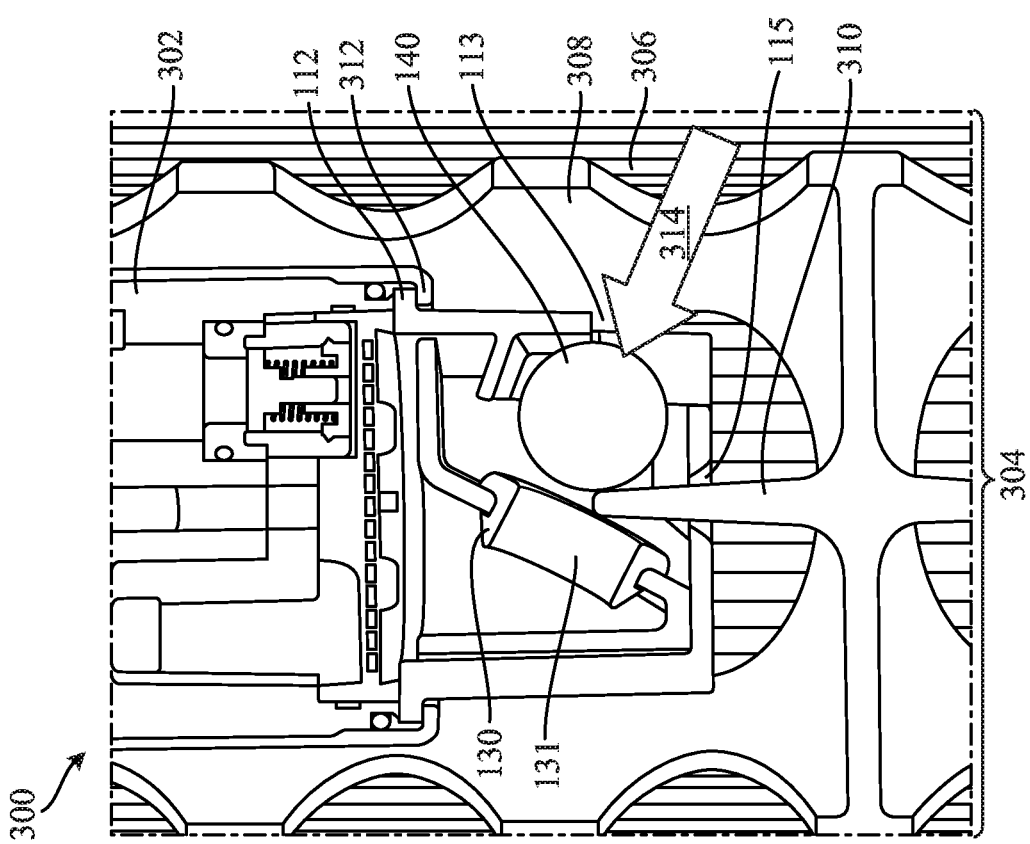
FIG. 3A
FIG. 3B

RETROFITTABLE NO FILTER NO RUN FILTRATION SYSTEM

CROSS REFERENCE TO RELATED APPLICATIONS

The present application is a National Stage of PCT Application No. PCT/US2017/021126, filed Mar. 7, 2017, which claims priority to U.S. Provisional Patent Application No. 62/305,273, filed Mar. 8, 2016. PCT Application No. PCT/US2017/021126 also claims priority to Chinese Utility Model No. ZL201620390745.8, filed on May 3, 2016 and issued on Jan. 18, 2017. The contents of all three applications are incorporated by reference in their entirety.

TECHNICAL FIELD

The present disclosure relates generally to filtration systems having a replaceable filter element.

BACKGROUND

Internal combustion engines generally combust a mixture of fuel (e.g., gasoline, diesel, natural gas, etc.) and air. Prior to entering the engine, fluids, such as fuel and oil, are typically passed through filter elements to remove contaminants (e.g., particulates, dust, water, etc.) from the fluids prior to delivery to the engine. The filter elements require periodic replacement as the filter media of the filter elements captures and removes the contaminants from the fluids passing through the filter media. In some cases, unauthorized or non-genuine replacement filter elements may be installed in the filtration systems during servicing operations. The unauthorized and non-genuine replacement filter elements may be of inferior quality compared to genuine, authorized filter elements. The use of unauthorized or non-genuine replacement filter elements may cause damage to the engine by allowing contaminants to pass through the filter element.

Some engine and filtration system implement various engine integrity protection ("EIP") features, such as the implementation of no filter no run ("NFNR") systems. In an NFNR system, the engine will either not run or run in a limited capacity (e.g., in a limp mode) if no filter element is installed in the filtration system or, in some instances, if an improper filter element is installed. However, many engine and filtration systems are not equipped with such EIP features. These engine and filtration systems are therefore susceptible to damage if used without any filter element or with improper replacement filter elements.

SUMMARY

One embodiment relates to a no filter no run attachment. The attachment comprises a shell defining a fluid passage from an upstream fluid aperture at a first end for fluid receiving communication with a filtration cartridge to a downstream fluid aperture at a corresponding second end sized and shaped for coupling to a fluid pump inlet, the shell further defining a pin aperture at the first end sized to receive a pin from the filtration cartridge. The attachment further comprises a divider segmenting the fluid passage into an upstream portion that comprises the upstream fluid aperture and the pin aperture and a downstream portion that comprises the downstream fluid aperture, and defining an internal aperture on the divider that allows fluid communication between the upstream portion and the downstream portion. The attachment comprises a ball disposed in the upstream portion in fluid flow receiving communication with the upstream fluid aperture, and sized to have a greater diameter than the internal aperture such that an operative engagement of the ball with the divider within the internal aperture blocks fluid communication between the upstream portion and the downstream portion.

Another embodiment relates to a fluid filtration assembly. The assembly comprises a filtration cartridge comprising a filtration media disposed about a filter frame defining a central bore with a pin protruding into an end of the central bore. The assembly further comprises a pump inlet disposed within the central bore. The assembly comprises a no filter no run attachment coupled to the pump inlet within the central bore. The attachment comprises a shell defining a fluid passage from an upstream fluid aperture at a first end for fluid receiving communication with the filtration cartridge to a downstream fluid aperture at a corresponding second end sized and shaped for coupling to the pump inlet, the shell further defining a pin aperture through which the pin of the filtration cartridge is disposed. The attachment further comprises a divider segmenting the fluid passage into an upstream portion that comprises the upstream fluid aperture and the pin aperture and a downstream portion that comprises the downstream fluid aperture, and defining an internal aperture on the divider that allows fluid communication between the upstream portion and the downstream portion. The attachment comprises a ball disposed in the upstream portion in fluid flow receiving communication with the upstream fluid aperture, and sized to have a greater diameter than the internal aperture such that an engagement of the ball to the divider within the internal aperture blocks fluid communication between the upstream portion and the downstream portion. The pin prevents the engagement of the ball to the divider.

Still another embodiment comprises a method of operating a fluid filtration assembly, comprising coupling a no filter no run attachment to a pump inlet. The no filter no run attachment comprises a shell defining a fluid passage from an upstream fluid aperture at a first end for fluid receiving communication with a filtration cartridge to a downstream fluid aperture at a corresponding second end sized and shaped for coupling to the pump inlet, the shell further defining a pin aperture through which a pin of the filtration cartridge may be disposed. The no filter no run attachment further comprises a divider segmenting the fluid passage into an upstream portion that comprises the upstream fluid aperture and the pin aperture and a downstream portion that comprises the downstream fluid aperture, and defining an internal aperture on the divider that allows fluid communication between the upstream portion and the downstream portion. The no filter no run attachment still further comprises a ball disposed in the upstream portion in fluid flow receiving communication with the upstream fluid aperture. The ball is sized to have a greater diameter than the internal aperture such that an engagement of the ball to the divider within the internal aperture blocks fluid communication between the upstream portion and the downstream portion. In particular embodiments, a filter cartridge is coupled to the no filter no run attachment, the filter cartridge including the pin, the pin entering the pin aperture, thereby preventing engagement of the ball with the divider.

These and other features, together with the organization and manner of operation thereof, will become apparent from the following detailed description when taken in conjunction with the accompanying drawings.

BRIEF DESCRIPTION OF THE FIGURES

FIG. 3A is a lateral cross-sectional view of a portion of a filtration assembly that includes the NFNR attachment of FIG. 1 and a genuine or authorized filter element.

FIG. 3B is a lateral cross-sectional view of a portion of a filtration assembly that includes the NFNR attachment of FIG. 1 and a non-genuine or unauthorized filter element.

DETAILED DESCRIPTION

Referring to the figures generally, a retrofit NFNR attachment for existing filtration systems manufactured without a no filter no run EIP feature is depicted. The attachment is beneficial for a manufacturer that initially does not require the benefit of a no filter no run EIP feature but later requires such a feature. The attachment can be coupled onto an existing filtration system without significant modification to the existing filtration system head. The NFNR attachment prevents the equipment supplied by the filtration system (e.g., an internal combustion engine) from being operated without a filter element. Further, the NFNR attachment prevents the equipment supplied by the filtration system from being operated with an unauthorized or non-genuine replacement filter element. The NFNR attachment safeguards against damage to downstream components of the filtration system and malfunctions of equipment in which the filtration system is used.

Figure 1:
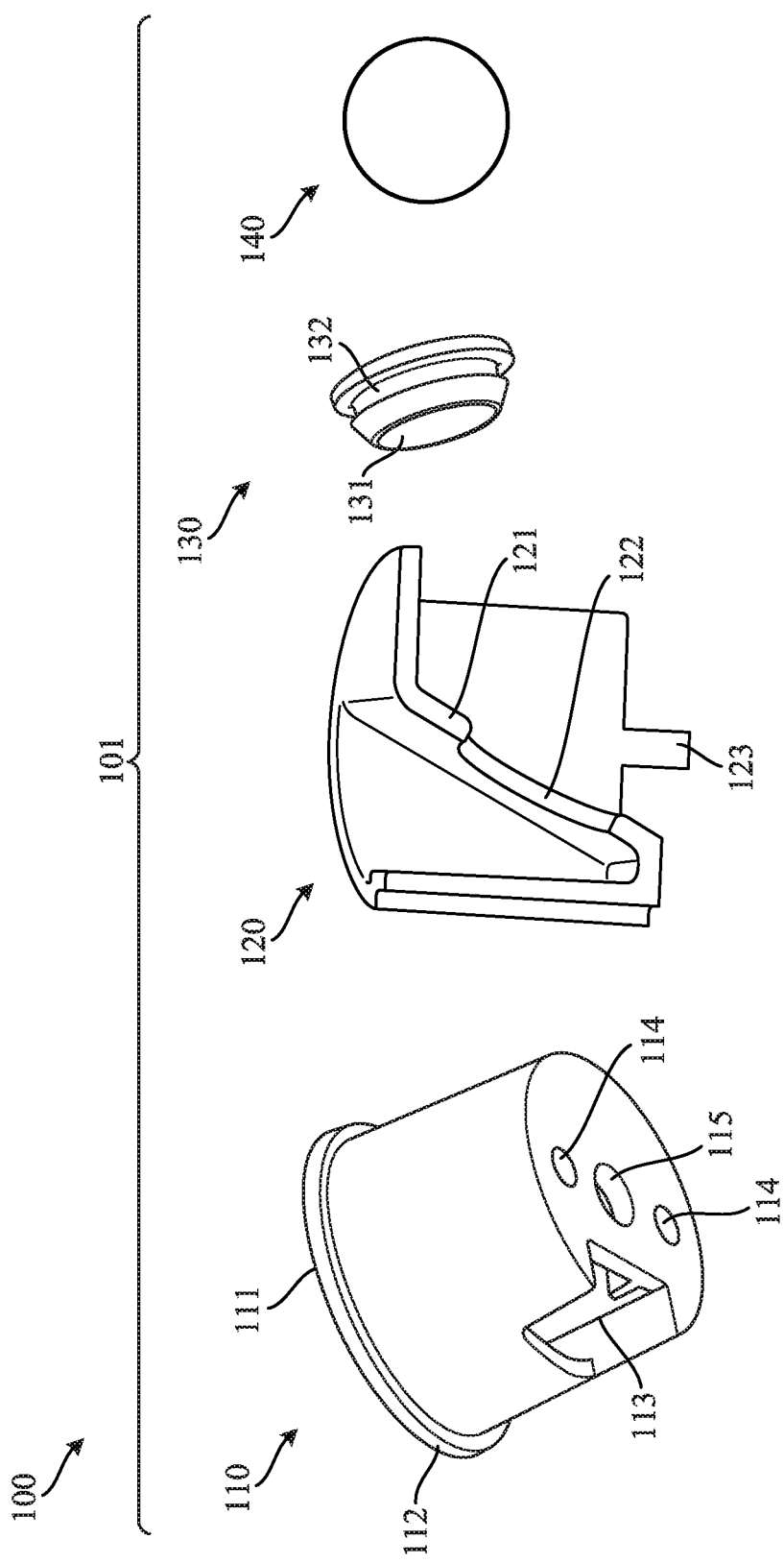
FIG. 1 is an exploded view of a NFNR attachment, according to an example embodiment.

Referring to FIG. 1, an exploded view 100 of a NFNR attachment 101 is shown according to an example embodiment. The NFNR attachment 101 includes a shell 110, a cage, 120, a grommet 130, and a ball 140. In some arrangements, the shell 110, the cage 120, and the grommet 130 may be independently formed and later assembled together into the NFNR attachment 101. In other arrangements, the features of at least the shell 110 and the cage 120 are formed as a unitary structure.

The shell 110 is an external housing of the NFNR attachment 101. In some arrangements, the NFNR attachment 101 is formed separately and distinctly from the fluid inlet, and may be retrofitted to the fluid inlet. The shell 110 may be formed of various plastics selected to provide a firm housing while resisting degradation and wear due to exposure to fluid flows, including flows of diesel or unleaded fuel (e.g., plastics). The shell 110 defines an upstream fluid aperture 113 at a first end and a downstream fluid aperture 111 at a corresponding second end that is sized and shaped for coupling to the fluid inlet of a filtration system. In some arrangements, an annular flange 112 is disposed about the outer circumference surrounding the downstream fluid aperture 111. In addition, in some arrangements, the first end of the shell 110 further defines a pair of snap apertures 114 and a pin aperture 115.

The cage 120 includes features that are sized and shaped to define a fluid flow passage within the shell 110. In some arrangements, the cage 120 further includes one or more snap protrusions 123 that are configured to be disposed through corresponding snap apertures 114 in the shell 110 for a snap-fit installation. The cage 120 includes a divider 121 that spans a cross section of the fluid flow passage and defines an internal aperture 122 that allows for fluid communication from one side of the divider 121 to the other side of the divider 121.

In various arrangements, the grommet 130 is formed of a material selected to provide a leak-proof or substantially leak-proof engagement to the divider 121 at the internal aperture 122 as well as the ball 140 (e.g., rubber). The grommet 130 defines an annular groove 132 structured to engage the inner circumference of the internal aperture 122 and a concentric grommet bore 131 structured to provide a path of fluid flow from one side of the divider 121 to the other side of the divider 121 upon installation in the cage 120. While the ball 140 is substantially spherical in one embodiment, it should be understood that, in various arrangements, the ball 140 may not be perfectly or substantially spherical, instead having more of an oblong, oval or another shape. The ball 140 is configured to operatively engage the divider 121, i.e., interact with the divider (either through direct or indirect contact) in a manner so as to block fluid flow through the internal aperture 122 and/or the grommet bore 131. The ball 140 has a larger diameter than the grommet bore 131, and in some arrangements, is of a lesser density than the fluid filtered by an associated filter assembly. The ball 140 is structured for transient engagement to the divider 121 at the internal aperture 122 and/or the grommet bore 131. Accordingly, in one arrangement, a fluid flow may press the ball 140 up against the grommet 130 and block the grommet bore 131, thereby preventing passage of fluid through the divider 121. In turn, if the fluid flow abates, the ball 140 may disengage from the grommet 130 and expose the grommet bore 131.

Figure 2A:
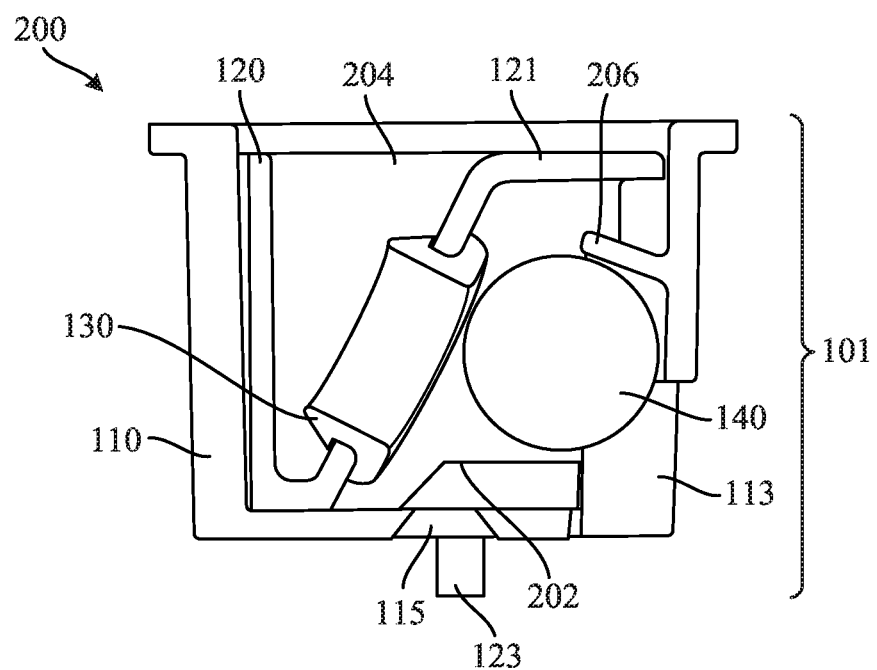
FIG. 2A is a lateral cross-sectional view of the NFNR attachment shown in FIG. 1.
Figure 2B:
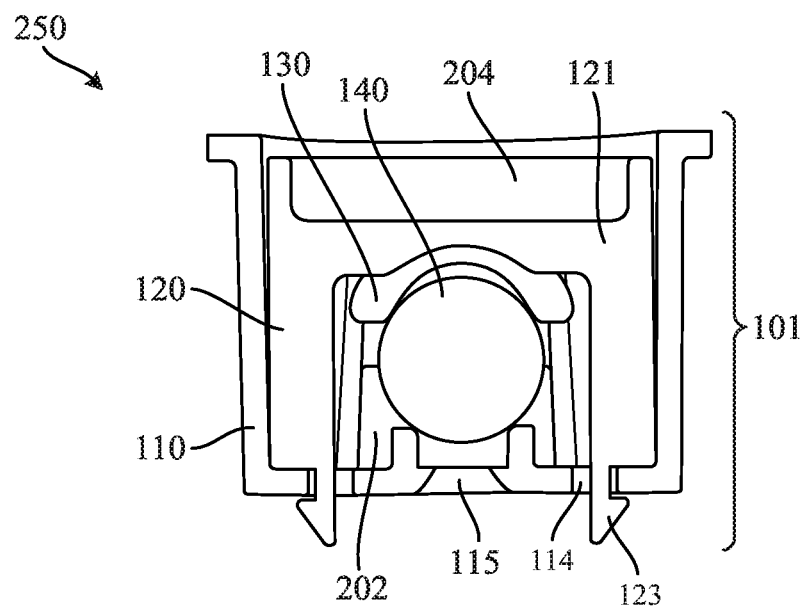
FIG. 2B is a frontal cross-sectional view of the NFNR attachment shown in FIG. 1.

Referring now to FIGS. 2A and 2B, a lateral cross-sectional view 200 and a frontal cross-sectional view 250 of the assembled NFNR attachment 101 are shown. The grommet 130 is coupled to the divider 121 of the cage 120, and the cage 120 is installed within the shell 101. In various arrangements, the snap protrusions are disposed through corresponding snap apertures 114 in the shell to secure the coupling of the cage 120 to the shell 110. Upon assembly, a fluid passage is defined by the upstream fluid aperture 113 of the shell 110, the grommet bore 131, and the downstream fluid aperture 111 of the shell 110. In addition, the divider 121 segments the fluid passage into an upstream portion 202 and a downstream portion 204 relative to the direction of fluid flow through the fluid passage. The ball 140 is disposed in the upstream portion 202. As such, a fluid flow into the upstream fluid aperture 113 may push the ball 140 toward and partially into the grommet bore 131 of the grommet 130, thereby blocking the fluid flow from reaching the downstream portion 204. In addition, in some arrangements, a protrusion 206 extending from an interior wall of the shell 110 may be configured to position the ball 140 adjacent to the grommet bore 131 and prevent the ball 140 from getting trapped or stuck at a position within the upstream portion 202 away from the grommet 130.

FIG. 3A shows a first arrangement 300 of a fluid filtration assembly where the NFNR attachment 101 is coupled to a pump inlet 302 disposed within a central bore of a genuine or authorized fluid filter 304. The pump inlet 302 is in fluid providing communication with a fluid pump (e.g., an electric fluid pump, a mechanical fluid pump, etc.) that draws a fluid from a reservoir (e.g., fuel, oil, hydraulic fluid, water, etc.) through the genuine fluid filter 304, into the NFNR attachment 101, and into the pump inlet 302. Filtered fluid in the pump inlet 302 is then provided to a system via the associated pump, such as an internal combustion engine.

In the first arrangement 300, the shell 110 of the NFNR attachment 101 is coupled to the pump inlet 302 by an engagement portion 312 of the pump inlet 302. In the arrangement shown, the engagement portion 312 is a circumferential extension of an outer housing of the pump inlet 302 that is annularly disposed about the outer circumference of the annular flange 112 of the shell 110 and subsequently crimped to the annular flange 112. In some arrangements, the NFNR attachment 101 is permanently coupled to the pump inlet 302 such that a subsequent removal of the NFNR attachment 101 would damage the pump inlet 302 and/or otherwise disrupt the operation of the pump inlet 302.

The genuine fluid filter 304 includes a filtration medium 306 operatively coupled to a filter frame 308 disposed within. In various arrangements, the filtration medium 306 may be structured as corrugated fluid filtration material disposed in an overall cylindrical shape, with a cylindrical arrangement of the filter frame 308 concentrically disposed within. The filter frame 308 defines the central bore into which the pump inlet 302 and the coupled NFNR attachment 101 may be disposed, as well as a plurality of sidewall apertures allowing fluid communication between the filtration medium 306 and the upstream fluid aperture 113 of the NFNR attachment 101. In addition, the filter frame 308 includes a pin 310 disposed within the central bore that corresponds to the size and location of the pin aperture 115 of the shell 110. Upon coupling of the genuine fluid filter 304 to the pump inlet 302, the pin 310 is disposed through the pin aperture 115 such that a tip of the pin 310 is positioned adjacent to the grommet 130.

In operation, the NFNR attachment 101 is assembled and coupled to the pump inlet 302. The genuine fluid filter 304 is then coupled to the pump inlet 302, disposing the pin 310 into the pin aperture 115 and between the grommet 130 and the ball 140. An associated fluid pump is actuated (e.g., via actuation of an associated internal combustion engine), giving rise to a fluid flow 314 across the filtration medium 306 and into the upstream fluid aperture 113 of the NFNR attachment 101. The fluid flow 314 encounters and flows into the ball 140; however, the pin 310 prevents the ball 140 from moving into and blocking the grommet bore 131. As such, the fluid flow 314 may flow around the pin 310 and the ball 140, through the grommet bore 131 into the downstream portion 204 of the NFNR attachment 101, into the pump inlet 302, and then to the system (e.g., the internal combustion engine).

Referring now to FIG. 3B, a second arrangement 350 of a fluid filtration assembly shows the NFNR attachment 101 as coupled to a pump inlet 302 disposed within a central bore of a non-genuine or unauthorized fluid filter 352. In the second arrangement 350, the pump inlet 302 and the NFNR attachment 101 may be structured in a substantially similar manner as described with respect to the first arrangement 300 of FIG. 3A, however the non-genuine fluid filter 352 is missing the pin 310 of the first arrangement 300. As such, in operation, the fluid flow 314 may push the ball 140 into the grommet bore 131 of the grommet 130. Engagement of the ball 140 to the grommet 130 effectively prevents the fluid flow 314 from reaching the pump inlet 302, and therefore prevents the fluid flow 314 from reaching the system (e.g., the internal combustion engine). Similarly, the fluid flow 314 may push the ball 140 into the grommet bore 131 and block the fluid flow 314 if no fluid filter is coupled to the pump inlet 302.

Thus, the NFNR attachment 101 provides a retrofit solution for filtration systems not originally designed with an NFNR EIP feature. The NFNR attachment can be coupled to these filtration systems without significant modification to the pump inlet 302. The NFNR attachment 101 will assist in preventing possible system (e.g., internal combustion engine) damage that may be caused by unauthorized or non-genuine filter elements being installed or the absence of a filter element in an associated filtration system. This EIP feature would therefore reduce or eliminate warranty claims related to the system.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, unless otherwise noted, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A no filter no run attachment, comprising:
 a shell defining a fluid passage from an upstream fluid aperture at a first end for fluid receiving communication with a filtration cartridge to a downstream fluid aperture at a second end, the shell sized and shaped for coupling to a fluid pump inlet such that the fluid pump inlet is annularly disposable about an outer circumference of the shell,
 the shell comprising an annular flange disposed about the outer circumference of the shell and surrounding the downstream fluid aperture of the shell, the annular flange structured for engagement to the fluid pump inlet,
 the shell defining a pin aperture at the first end sized to receive a pin from the filtration cartridge;
 a divider segmenting the fluid passage into an upstream portion that comprises the upstream fluid aperture and the pin aperture and a downstream portion that comprises the downstream fluid aperture, the divider defining an internal aperture that allows fluid communication between the upstream portion and the downstream portion; and a ball disposed in the upstream portion in fluid flow receiving communication with the upstream fluid aperture, the ball having a greater diameter than a diameter of the internal aperture such that an operative engagement of the ball with the divider within the internal aperture blocks fluid communication between the upstream portion and the downstream portion.

2. The attachment of claim 1, wherein the ball is less dense than a fluid of the fluid flow.

3. The attachment of claim 1, further comprising a grommet coupled to the divider concentrically within the internal aperture and defining a grommet bore providing fluid communication between the upstream portion and the downstream portion.

4. The attachment of claim 3, wherein the grommet is formed of a material enabling leak resistant engagements to each of the divider and the ball.

5. The attachment of claim 1, wherein the divider is formed as part of a cage disposed within the shell.

6. The attachment of claim 5, wherein the cage comprises at least one snap protrusion and the shell comprises at least one corresponding snap aperture, and wherein the cage is secured in the shell by a snap fit of the at least one snap protrusion in the at least one corresponding snap aperture.

7. The attachment of claim 1, wherein the annular flange is structured for engagement to the fluid pump inlet through crimping.

8. The attachment of claim 1, wherein the shell comprises an interior protrusion in the upstream portion, the interior protrusion structured to position the ball adjacent to the internal aperture.

9. A fluid filtration assembly comprising:
a filtration cartridge comprising a filtration media disposed about a filter frame defining a central bore with a pin protruding into an end of the central bore;
a pump inlet disposed within the central bore; and
a no filter no run attachment coupled to the pump inlet within the central bore and comprising:
a shell defining a fluid passage from an upstream fluid aperture at a first end for fluid receiving communication with the filtration cartridge to a downstream fluid aperture at a corresponding second end sized and shaped for coupling to the pump inlet,
the shell comprising an annular flange disposed about an outer circumference of the shell and surrounding the downstream fluid aperture of the shell, the annular flange structured for engagement to the pump inlet,
the shell further defining a pin aperture through which the pin of the filtration cartridge is disposed;
a divider segmenting the fluid passage into an upstream portion that comprises the upstream fluid aperture and the pin aperture and a downstream portion that comprises the downstream fluid aperture, and defining an internal aperture on the divider that allows fluid communication between the upstream portion and the downstream portion; and
a ball disposed in the upstream portion in fluid flow receiving communication with the upstream fluid aperture, and sized to have a greater diameter than the internal aperture such that an engagement of the ball to the divider within the internal aperture blocks fluid communication between the upstream portion and the downstream portion,
wherein the pin prevents the engagement of the ball with the divider.

10. The assembly of claim 9, wherein the ball is less dense than a fluid of the fluid flow.

11. The assembly of claim 9, further comprising a grommet coupled to the divider concentrically within the internal aperture and defining a grommet bore providing fluid communication between the upstream portion and the downstream portion.

12. The assembly of claim 11, wherein the grommet is formed of a material enabling leak resistant engagements to each of the divider and the ball.

13. The assembly of claim 9, wherein the divider is formed as part of a cage disposed within the shell.

14. The assembly of claim 13, wherein the cage comprises at least one snap protrusion and the shell comprises at least one corresponding snap aperture, wherein the cage is secured in the shell by a snap fit of the at least one snap protrusion in the at least one corresponding snap aperture.

15. The assembly of claim 9, wherein the annular flange is structured for engagement to the pump inlet through crimping.

16. The assembly of claim 9, wherein the shell comprises an interior protrusion in the upstream portion structured to position the ball adjacent to the internal aperture.

17. The assembly of claim 9, wherein the pump inlet is formed as a distinct structure from the no filter no run attachment.

18. A method of operating a fluid filtration assembly, comprising:
coupling a no filter no run attachment to a pump inlet, the no filter no run attachment comprising:
a shell defining a fluid passage from an upstream fluid aperture at a first end for fluid receiving communication with a filtration cartridge to a downstream fluid aperture at a corresponding second end, the shell sized and shaped for coupling to the pump inlet such that the pump inlet is annularly disposed about an outer circumference of the shell,
the shell comprising an annular flange disposed about the outer circumference of the shell and surrounding the downstream fluid aperture of the shell, the annular flange structured for engagement to the pump inlet,
the shell further defining a pin aperture through which a pin of the filtration cartridge may be disposed;
a divider segmenting the fluid passage into an upstream portion that comprises the upstream fluid aperture and the pin aperture and a downstream portion that comprises the downstream fluid aperture, and defining an internal aperture on the divider that allows fluid communication between the upstream portion and the downstream portion; and
a ball disposed in the upstream portion in fluid flow receiving communication with the upstream fluid aperture, and sized to have a greater diameter than the internal aperture such that an engagement of the ball to the divider within the internal aperture blocks fluid communication between the upstream portion and the downstream portion.

19. The method of claim 18, further comprising:
coupling the filter cartridge to the no filter no run attachment, the filter cartridge including the pin, the pin entering the pin aperture, thereby preventing engagement of the ball with the divider.

20. The method of claim 18, wherein the divider is formed as part of a cage disposed within the shell.

21. The method of claim 18, wherein the no filter no run attachment further comprises a grommet coupled to the divider concentrically within the internal aperture and defining a grommet bore providing fluid communication between the upstream portion and the downstream portion.

22. The method of claim 21, wherein the grommet is formed of a material enabling leak resistant engagements to each of the divider and the ball.

23. The method of claim 18, wherein the coupling of the no filter no run attachment to the pump inlet is a permanent coupling.

\* \* \* \* \*